United States Patent [19]
Chang et al.

[11] Patent Number: 5,781,418
[45] Date of Patent: Jul. 14, 1998

[54] SWITCHING SCHEME FOR POWER SUPPLY HAVING A VOLTAGE-FED INVERTER

[75] Inventors: Chin Chang, Ossining, N.Y.; Joseph En-Cheng Chang, New Haven, Conn.

[73] Assignee: Philips Electronics North America Corporation, New York, N.Y.

[21] Appl. No.: 773,243

[22] Filed: Dec. 23, 1996

[51] Int. Cl.[6] .............................. H02M 3/335; G05F 1/00
[52] U.S. Cl. .............................. 363/16; 363/132; 315/307
[58] Field of Search .............................. 363/16, 97, 132; 315/307

[56] References Cited

U.S. PATENT DOCUMENTS

| | | |
|---|---|---|
| 4,952,849 | 8/1990 | Fellows et al. . |
| 5,363,020 | 11/1994 | Chen et al. ............................ 315/307 |
| 5,416,387 | 5/1995 | Cuk et al. ............................ 363/16 |
| 5,438,243 | 8/1995 | Kong . |
| 5,559,688 | 9/1996 | Pringle ............................ 363/89 |
| 5,677,602 | 10/1997 | Paul et al. ............................ 315/307 |

FOREIGN PATENT DOCUMENTS 2223384  9/1990  Japan .

OTHER PUBLICATIONS

"A Comparison of Half-Bridge Resonant Converter Topologies," IEEE Transactions on Power Electronics, Apr. 1988, pp. 174–181.

"A New and Improved Control Techniwue," Proceeding of IEEE Applied Power Electronics Conference, Mar. 1995, pp. 657–664.

555 timing IC 300, produced by Motorola.

AD654 produced by Analog Devices of Norwood, Massachusetts.

IR2111 produced by International Rectifier, El Segundo, California.

IEEE "Self Excited Half–Bridge Series Resonant Parallel Loaded Fluorescent Lamp Electronic Ballasts" by T.-H. Yu, H.-M. Huang and T.-F. Wu, pp. 657–664.

Primary Examiner—Stuart N. Hecker
Attorney, Agent, or Firm—Walter Egbert

[57] ABSTRACT

A power supply is disclosed which includes a resonant circuit, and a voltage-fed inverter producing an applied voltage at an output coupled to the resonant circuit, the inverter responsive to a driving signal. A driving circuit has an input representing the sensed current flowing through the resonant circuit and includes phase-shifting circuitry. The driving circuit produces the driving signal based on phase-shift of the sensed current by the phase-shifting circuitry.

19 Claims, 11 Drawing Sheets

SWITCHING SCHEME FOR POWER SUPPLY HAVING A VOLTAGE-FED INVERTER

BACKGROUND OF THE INVENTION

1. Field of the Invention

The invention generally concerns power supplies and lighting ballasts, and more particularly to zero-voltage-switched (ZVS) inverters.

2. Description of the Prior Art

Electronic lamp ballasts include inverters to provide a high frequency substantially square wave voltage output to a load. The load typically includes a resonant circuit and a lamp. A typical inverter circuit includes power switching circuitry (i.e. transistors) to convert a DC input to a desired high frequency AC output.

A control circuit, such as disclosed in U.S. Pat. No. 4,952,849 to Fellows et al. for driving the switching circuitry of voltage-fed inverter, senses current flowing through the load to control the switching circuitry. The switches are turned on so as to minimize damage thereto during transition and is commonly referred to as zero-voltage switching (ZVS). The switching technique minimizes voltage across the switch as the switch is being turned on.

The switching frequency of the inverter is typically above the resonant frequency of the resonant circuit, that is, to maintain the resonant circuit in an inductive mode. It is critical to maintain the circuit in an inductive mode when transitioning between the power switches in a ZVS scheme. Otherwise, large power losses and damage to the components within the circuit can result.

One commonly used method to achieve zero-voltage switching is to maintain the switching frequency higher than the resonant frequency, as described in Steigerwald, "A Comparison of Half-Bridge Resonant Converter Topologies," *IEEE Transactions on Power Electronics*, April 1988, pp. 174–181, incorporated by reference herein. This frequency-based scheme can be easily implemented using voltage controlled oscillators (VCO). However, a critical requirement of such control method is that prior knowledge of the resonant frequency is needed to determine the frequency sweeping region. In simple applications, for example, in LC resonant inverter-based power supplies and electronic ballasts with a single lamp, the maximum gain frequency does not change significantly during the load and line changes as long as the inverters are operated in the high-Q condition. In these cases, the frequency-based control method operates successfully.

However, in some cases, the characteristics of the resonant circuit can change with lamp loads, bus voltage, ambient conditions or aging of the components. Such changes can affect the operating mode of the resonant circuit. Simple frequency based control methods may be unable to adapt to the new frequency-sweep region and therefore be unable to maintain zero voltage switching.

The circuit of Nalbant, "A New and Improved Control Technique," *Proceedings of IEEE Applied Power Electronics Conference*, March 1995, pp. 657–664, achieves zero voltage switching by increasing the operating frequency above the resonant frequency. Switching occurs by setting thresholds on the current flowing in a loading matching network. When one of these thresholds is crossed, switching occurs in the inverter. This approach has the disadvantage that threshold values must be chosen and set, and complex logic must be implemented. If the current values experience large fluctuations, the threshold may not be crossed and a correct switching cycle may be missed, or the wrong operating frequency may result.

Accordingly, it is the object of the invention to provide a zero-voltage switching scheme for a power supply or ballast having a voltage-fed inverter which overcomes the above mentioned disadvantages of the prior art.

SUMMARY OF THE INVENTION

A power supply or ballast is disclosed which includes a resonant circuit, a voltage-fed inverter producing a voltage at an output coupled to the resonant circuit, the inverter responsive to a driving signal. The power supply further includes a driving circuit having an input representing a sensed current flowing through the resonant circuit and including phase-shifting circuitry. The driving circuit produces the driving signal based on a phase-shift of the sensed current by the phase-shifting circuitry.

The phase-shifting circuitry applies a predetermined positive phase angle shift to the sensed current input such that the voltage at the output of the inverter is leading the sensed current input with the predetermined positive phase angle. The driving signal may actuate a switch in the inverter when the phase-shifted sensed current signal crosses zero. The phase shifting circuitry preferably includes an all-pass filter.

In a preferred embodiment, the driving circuit includes a filter for suppressing a low frequency component of the sensed current flowing through the resonant circuit. The power supply may further include a load, wherein the load is a low-pressure discharge lamp.

A method for switching a power supply is also disclosed which includes the steps of providing a resonant circuit having a current oscillating therethrough; providing an inverter responsive to a driving signal and producing a voltage at an output coupled to the resonant circuit; sensing the current oscillating through the resonant circuit; applying a phase angle shift to the current; applying a driving signal to the inverter based upon the phase-shifted current.

In a preferred embodiment, the method further includes the step of filtering the sensed current signal to suppress low frequency components prior to applying the phase angle shift. In the method for switching a power supply, the step of applying a driving signal to the inverter preferably includes actuating a switch in the inverter when the phase-shifted current crosses zero.

A method for switching a power supply is also disclosed which includes the steps of providing a resonant circuit having a current oscillating therethrough; providing an inverter responsive to a driving signal and producing a voltage at an output coupled to the resonant circuit; sensing the current oscillating through the resonant circuit and producing a sensed current signal proportional to the current; applying a phase angle shift to the sensed current signal and producing a phase-shifted signal; and applying a driving signal to the inverter based upon zero-crossing points of the phase-shifted signal.

It is an object of the invention to produce an improved zero-voltage switching scheme which employs a phase-shifting technique in timing the switching cycles in the inverter.

It is another object of the invention to provide a switching scheme which does not require prior identification of the resonant frequency.

It is a further object of the invention to provide a general switching scheme which is applicable to resonant circuits of second order and higher.

It is yet another object of the invention to provide a switching scheme which does not require complex threshold logic for the timing of the switches.

These and other objects, features and advantages of the invention will become apparent with reference to the accompanying drawings and the following detailed description and claims.

DETAILED DESCRIPTION OF THE PREFERRED EMBODIMENTS

Figure 1:
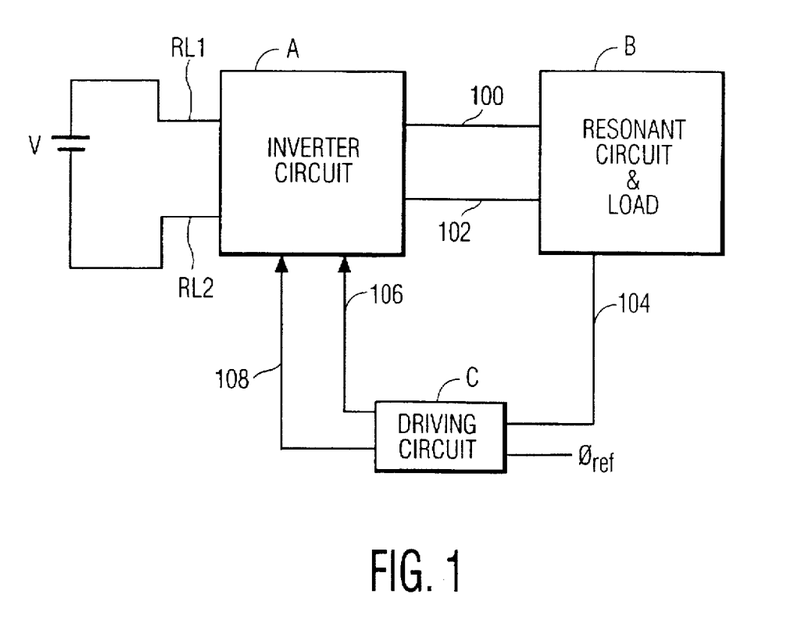
FIG. 1 is a block diagram of the power supply in accordance with an exemplary embodiment of the subject invention.

The power supply circuit shown in FIG. 1 includes a voltage source V, inverter circuit A, resonant circuit and load B, and driving circuit C which controls inverter circuit A. Voltage source V is a direct current voltage source supplying inverter circuit A via lines RL1 and RL2. Alternatively, an AC voltage source may be substituted in conjunction with a rectifier circuit, which may further include power correction. Inverter circuit A is of the voltage-fed half-bridge topology, and is under control of the driving circuit C. Resonant circuit B receives the substantially square wave output of inverter circuit A on lines 100 and 102 into a substantially sinusoidal lamp current. In the exemplary embodiment, the load is a multiple parallel-loaded lamp system.

The driving circuit C receives a voltage signal proportional to the current flowing through the resonant circuit B via line 104. Phase shifting circuitry is present in driving circuit C to shift the sensed current signal by a predetermined phase angle. The phase angle $\phi_{ref}$ is an input to the system. This phase angle could also be used as a dimming interface in dimmable lamp systems. The driving signals 106 and 108 to the inverter are based upon this phase-shifted current signal to provide zero-voltage switching and to control inverter circuit A.

The Inverter Circuit

Figure 2:
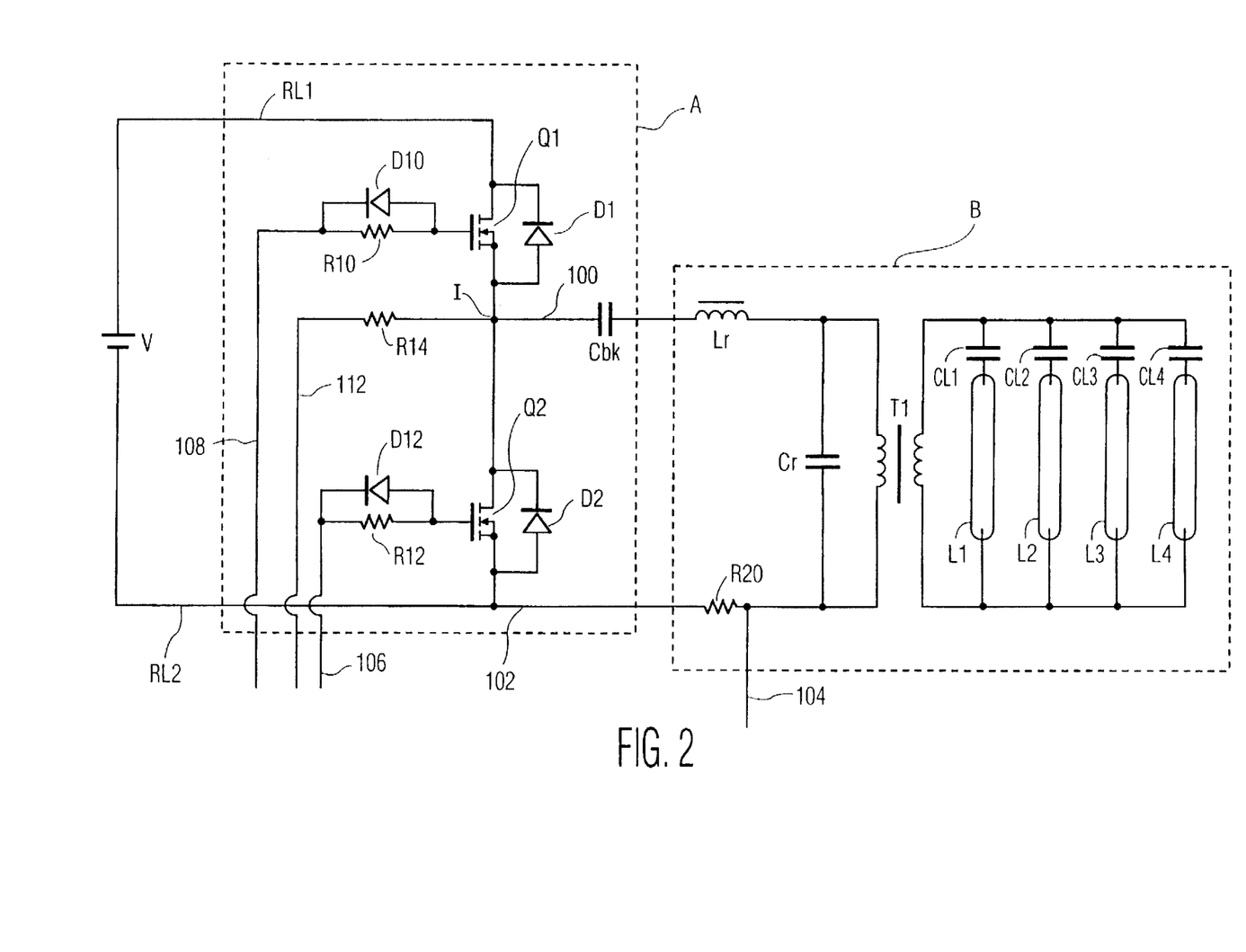
FIG. 2 is a schematic diagram of the inverter and the power supply.

Turning now to FIG. 2, inverter circuit A includes a pair of switches Q1 and Q2 which are arranged in a half-bridge configuration and convert the DC voltage from voltage source V to a high-frequency substantially square wave AC output signal across the inverter outputs, under the control of driver circuit C. Although the present embodiment is described with respect to a half-bridge inverter having a pair of switches, the switching scheme described herein is applicable to a full bridge topology having four switches. In such a configuration, the switches would be controlled in pairs rather than individually.

The switches Q1 and Q2 are preferably MOSFETs, although it is contemplated that BJTs could also be used as the power switches. Switch Q1 is connected in parallel with parasitic diode D1. A snubber capacitor may also be connected in parallel with switch Q1, which may include the junction capacitor contingent to switch Q1. Similarly, switch Q2 is connected in parallel with parasitic diode D2. Likewise, a snubber capacitor may also be connected in parallel with switch Q2, which may include the junction capacitor contingent to switch Q2. The drain of switch Q1 is connected via the rail RL1 to the output from the voltage source V. The source of the switch Q1 is connected to the drain of switch Q2. The control gate of switch Q1 is connected via control line 108 to a respective gate controller terminal of driving circuit C via a parallel arrangement of a resistor R10 and a diode D10. The anode of diode D10 is connected to the control gate of the switch Q1. The diode D10 provides rapid evacuation of charges from the control gate to enhance switching speed. The control gate of switch Q2 is similarly connected to a gate controller terminal of driving circuit C through control line 106. A similar parallel arrangement exists for switch Q2 with resistor R12 and diode D12. This particular arrangement has been implemented in conjunction with MOSFET switches Q1 and Q2. A different gate drive would be implemented for bipolar transistor switches, which is within the scope of the present invention.

Line 100 connects the midpoint I between the source of the switch Q2 and the drain of the switch Q1 to one end of the blocking capacitor Cbk. Capacitor Cbk blocks DC components of the inverter output voltage generated at node I. Line 112 connects the midpoint I via resistor R14 to driving circuit C, as will be described below. Line 102 is connected to the drain of switch Q2. Line 100 and line 102 serve as the output of inverter circuit A. The output of inverter A is a substantially square wave signal.

Resonant Circuit

With continued reference to FIG. 2, The resonant circuit B shapes the voltage and current waveforms to the load, such as a parallel loading of instant start fluorescent lamps L1, L2, L3, and L4, each in series with ballasting capacitors CL1, CL2, CL3, and CL4, respectively.

The resonant circuit B includes resonant inductor Lr connected in series with the blocking capacitor Cbk via line 100. Resonant capacitor Cr is connected in parallel with a primary winding of isolation transformer T1.

Due to the filtering action of the resonant circuit B on the square wave voltage output of the inverter circuit A, the current flows with a substantially sinusoidal waveform. This current is sensed by the voltage drop on line 102 across R20, having a small resistance. The sensed current signal on line 104 serves as a input to driving circuit C as will be described below.

Inverter Controller Circuit

Figure 3:
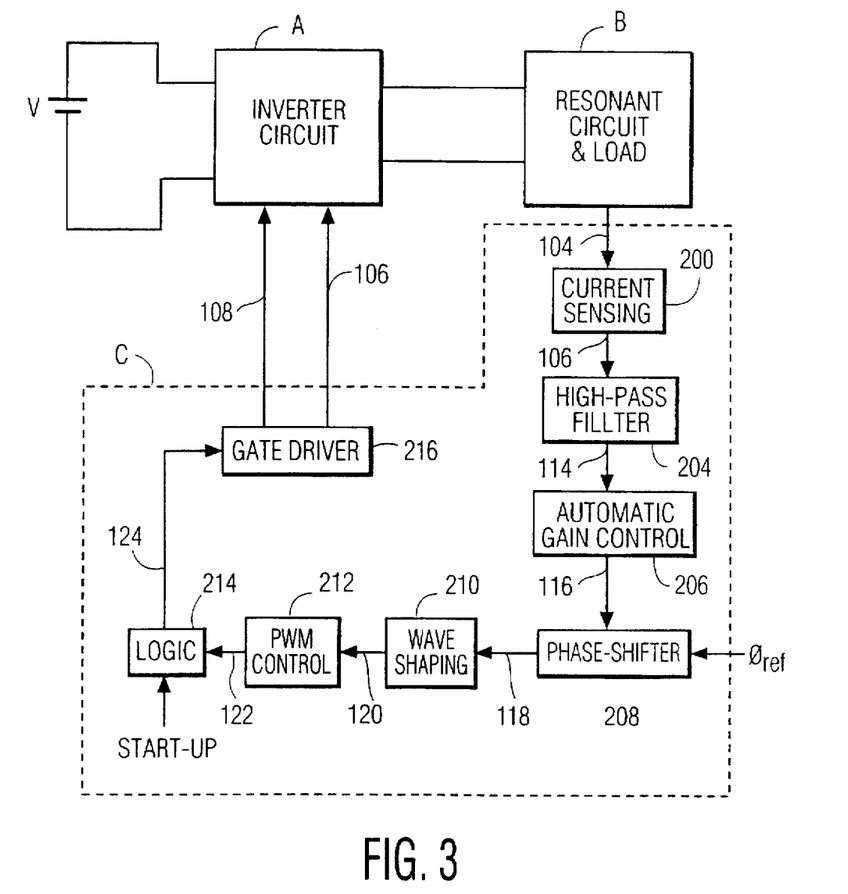
FIG. 3 is a block diagram of the power supply, illustrating the particular functions of the driving circuit.

FIG. 3 illustrates, in block diagram form, the components of driving circuit C. Current sensing circuit 200 senses the voltage drop across R20. High-pass filter 204 is used to filter one of the frequency components of the sensed current. The frequency component corresponding to the operating frequency is permitted to pass, but lower frequency signal components are suppressed from the current signal. Automatic gain control 206 is utilized to control the amplitude of the signal so as to avoid saturating circuit components. Phase shifting circuitry 208 provides a phase shift of $\phi_{ref}$ to the signal. Wave shaping circuitry 210 is triggered by the zero-crossing points of the phase-shifted current signal Pulse width modulation 212 produces the switch pulses, and gate driver 216 controls the timing of the switches and corresponding duty cycles. Start-up logic 214 transitions operation of the lamp from start-up to the steady state operating condition.

Figure 4:
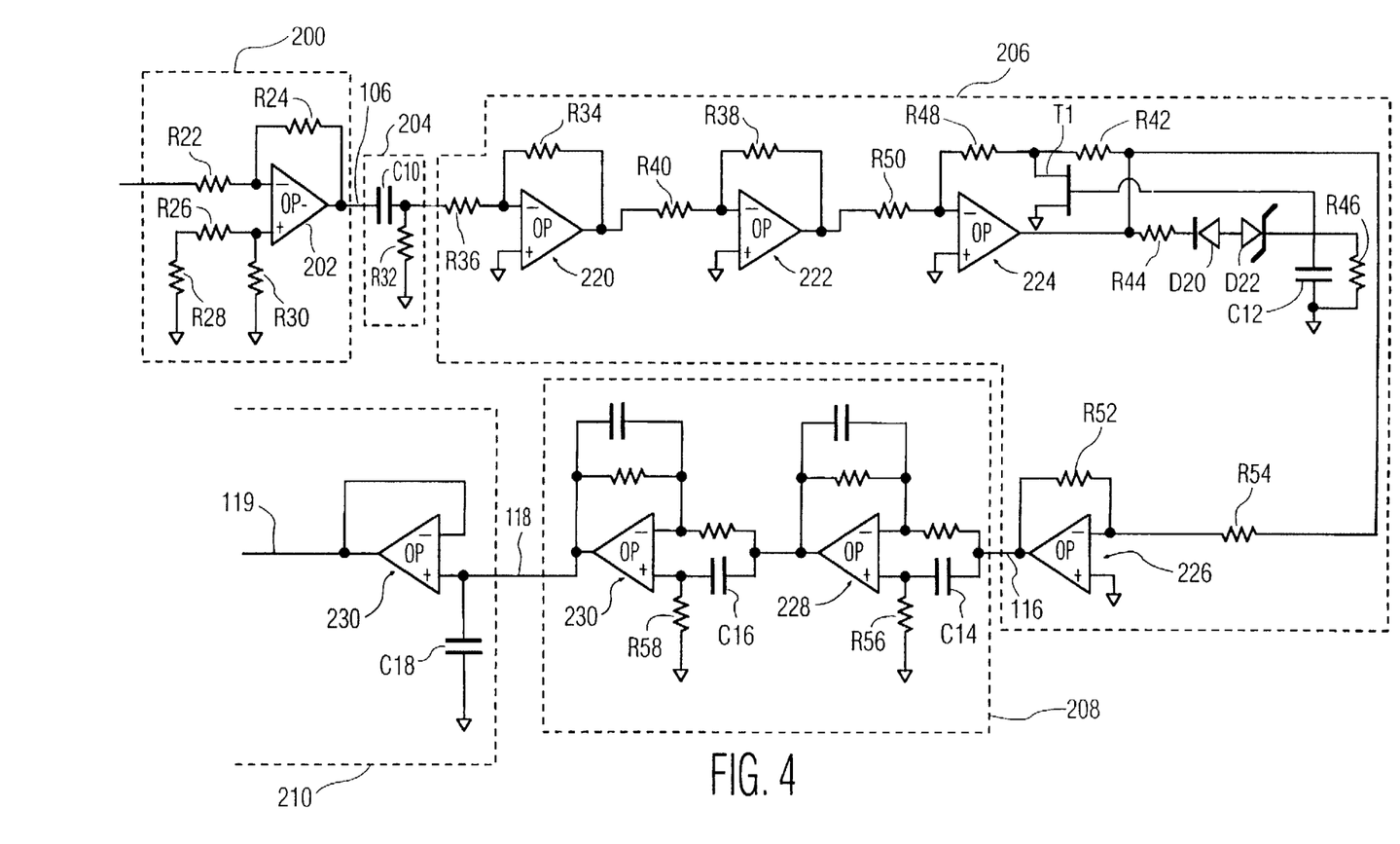
FIG. 4 is a schematic diagram of a portion of the driving circuit, illustrating the high-pass filter, gain control, phase-shift circuitry, and wave-shaping functions.

Turning now to FIG. 4, current sensing circuit 200, a differential amplifier, senses the voltage drop across R20. R22, R24, R26, R28 and R30 are connected to op-amp 202, such as LT1122, to provide output voltage signal on line 106 which is proportional to the current in the resonant circuit B. The signal is substantially sinusoidal at the operating frequency, and normally has lower frequency components. High pass filter 204 receives the signal of the sensed current. Capacitor C10 and resistor R32 are selected to suppress this low frequency component of the current signal. The present invention is applicable to resonant circuits of higher order as well. Therefore, there may be a plurality of low frequency components to the oscillating current signal which are suppressed by filter 204.

Automatic gain control 206 is provided on the output from high pass filter 204, which prevents the sensed current signal from saturating the components of the circuitry. A pair of inverting op amps 220 and 222 are used to scale the signal magnitude and provide positive gain factor. The ratio of external resistors R34/R36 for op amp 220 and R38/R40 for op amp 222 are selected to scale the signal. Because the amplitude of the signal flowing through the circuit may fluctuate, an automatic gain controller 224 is used to maintain the signal within a given range. Automatic gain controller 224 includes op-amp 226. The gain is controlled by voltage controlled resistor, such as JFET T1, in parallel with impedance R42. The gate of JFET T1 is connected to the feedback path consisting of impedance R44, diode D20, zener diode D22 and RC circuit consisting of resistance R46 and capacitance C12. An additional inverting amplifier 226 further scales the signal by selection of resistors R52 and R54.

Phase shifting of the signal is performed by the phase-shifting circuitry 208, which includes the pair of all-pass filters 228 and 230 in series. The all-pass filters incorporate op-amps such as LT1122. As is known in the art, such filters provide a loop gain of 1 but provide a predetermined phase angle shift to the signal passing therethrough.

The circuitry of the present invention allows the phase angle to be a driving variable. As described above, the application of a positive phase angle to the sensed current signal ensures zero-voltage switching when the zero-crossing points of the phase shifted signal is used as a control signal for turning on the switches in the inverter circuit A. Ideally, the selection of any positive phase angle will assure zero-voltage switching. In practice, however, due to the junction capacitance of the MOSFETs used for switches Q1 and Q2, there is a minimum phase angle requirement.

The phase angle may be implemented by an open loop or a closed loop based scheme. In the open loop scheme, the amount of phase shift may be preselected by selecting the amount of resistance R56 and R58 in parallel with the capacitors C14 and C16, respectively, to the non-inverting input in all-pass filters 228 and 230, respectively. Alternatively, voltage controlled resistors, such as JFETs may be used. The present circuit is shown with two all-pass filters, although a greater or fewer number of filters are contemplated. The optimum phase shift may be determined empirically from the circuit characteristics, such as the capacitance of the snubbing capacitors in parallel with switches Q1 and Q2 if used in the circuit, or the current.

Alternatively, a closed loop scheme may be implemented. With such a scheme, output voltage regulation may be performed by sensing the output voltage across the load. Since the output voltage is a function of the operating frequency or the phase angle, output voltage regulation may be achieved by adjusting the phase angle in order to produce the desired output voltage. This scheme may find application in light dimming ballasts.

Following the phase shifting of the signal, the wave shaping circuitry 210 provides timing for the initiation of the switching as will be described below. Filter including capacitor C18 shapes the signal, and buffer 230 is a voltage follower interposed to provide a low output impedance and isolation from the input. The output of buffer 230 is on line 119. Noninverting amplifier 232 (FIG. 5) includes op-amp 234, and external resistors R60 and R62 are selected to scale the voltage. Filter 236 includes resistor R64 and C20.

Figure 5:
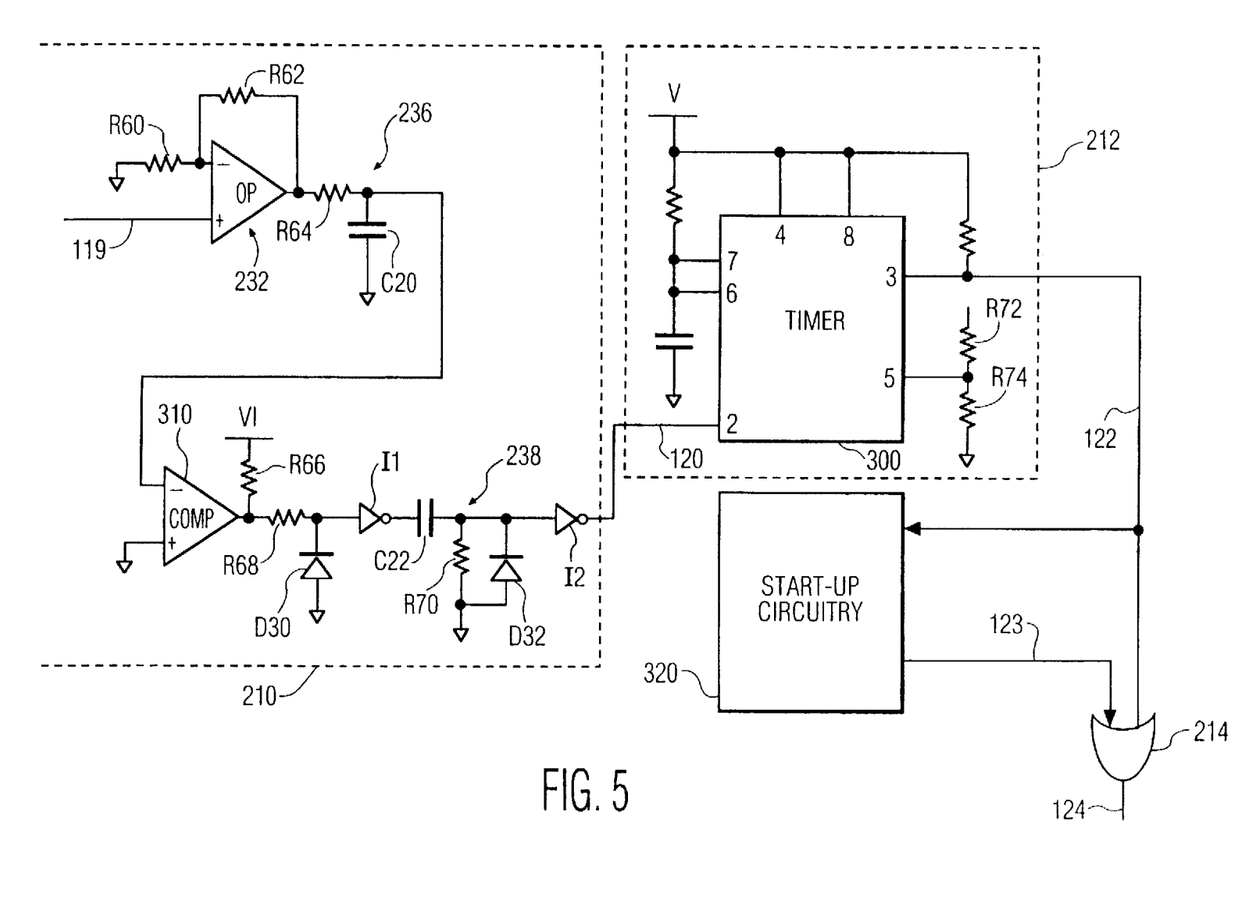
FIG. 5 is a partial schematic, partial logic diagram of a portion of the driving circuit, illustrating the wave-shaping and PWM functions.
Figure 5A:
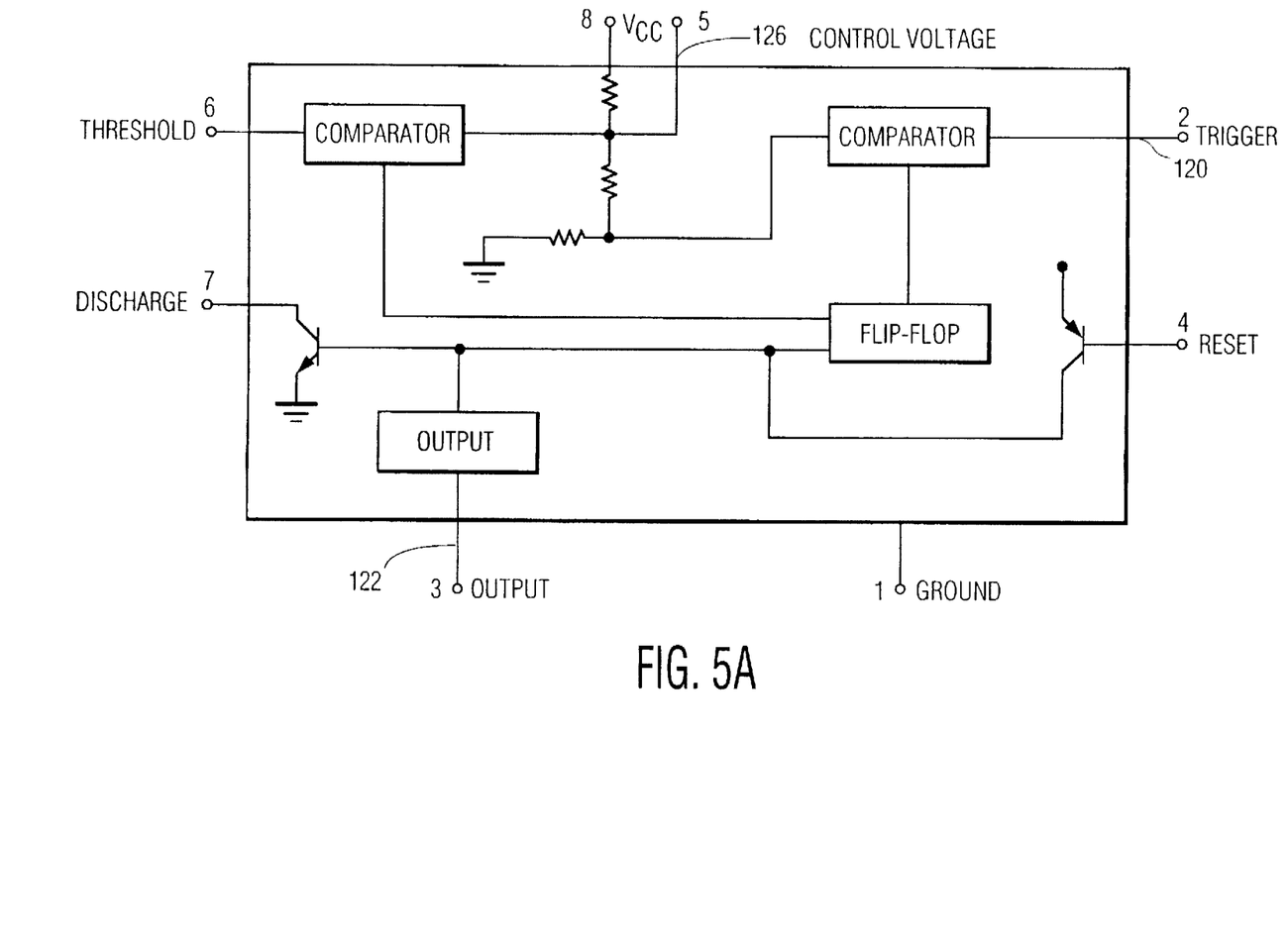
FIG. 5A is partial block diagram, partial schematic diagram of the timing circuit of FIG. 5.

With continued reference to FIG. 5, the switching signal is generated by a timing circuit, such as 555 timing IC 300, produced by Motorola, the specifications of which are incorporated by reference herein and illustrated in FIG. 5A. Timer 300 is configured in the monostable mode wherein the driving signal is triggered to the "on" state by the zero-crossing of the phase-shifted current signal. Comparator 310 converts the substantially sinusoidal analog voltage signal from filter 236 to a square wave sequence which corresponds to the zero-crossing point of the shifted current signal. The comparator converts this zero-crossing point to set the leading edge of the switching pulse. Applied voltage V1, in combination with resistors R66 and R68 and diode D30, provide a proper scaling to the signal to the inverter I1. High pass filter 238, including capacitor C22 and resistor R70 and diode D32 in parallel, and inverter I2 further shape the signal on line 120, which is connected to the trigger input (pin 2) of the timer 300. The threshold terminal (pin 7) and the discharge terminal (pin 6) are connected together in this mode. The control voltage at pin 5 is preset to a constant value by a voltage divider with resistors R72 and R74. The output signal is present on line 122 from output terminal (pin 3). Output signal on line 122 from timing circuit 300 and output on line 123 from start-up circuit 320 pass through OR gate 214 which acts as an electronic switch.

Figure 6:
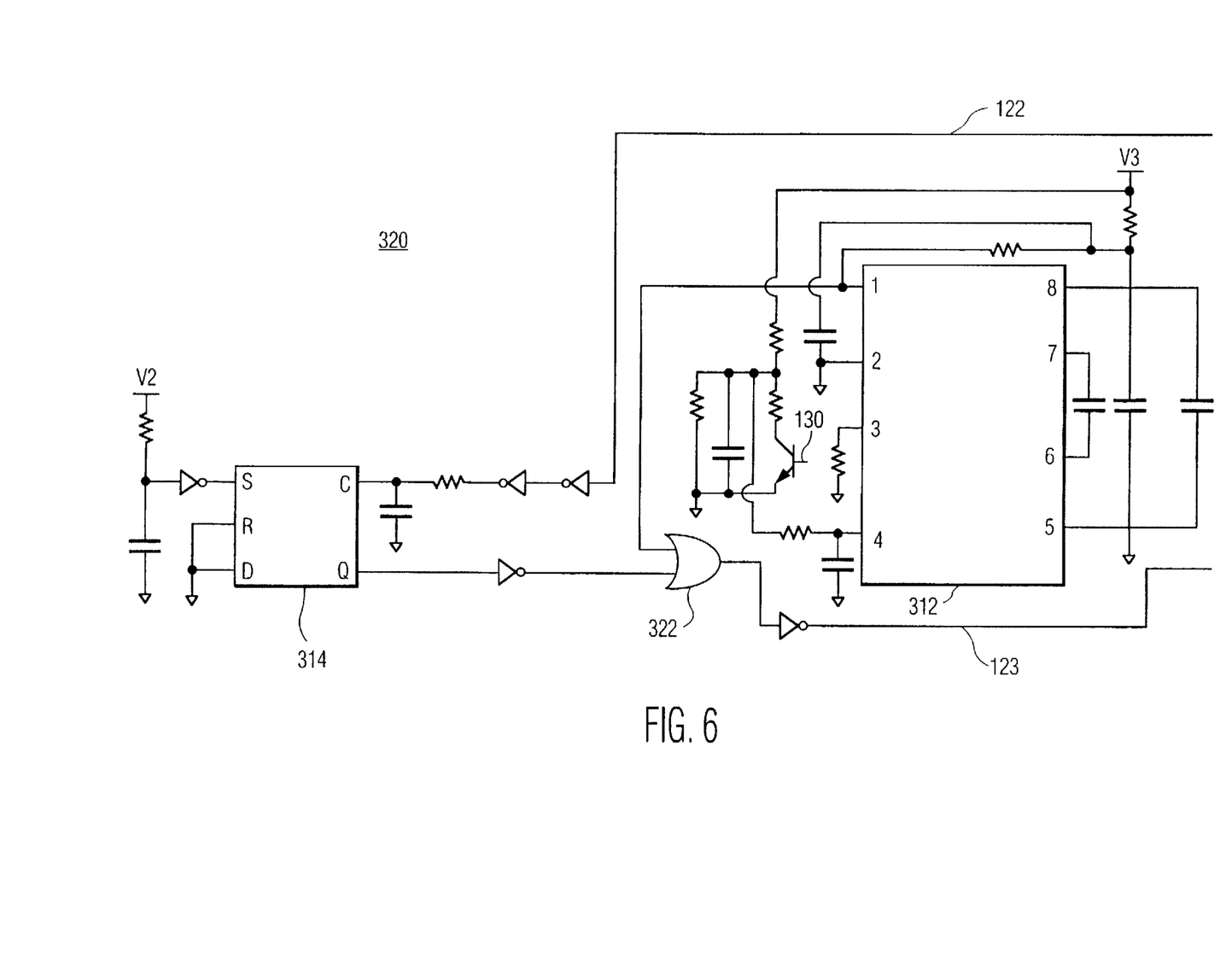
FIG. 6 is a schematic diagram illustrating the start-up circuitry.
Figure 7:
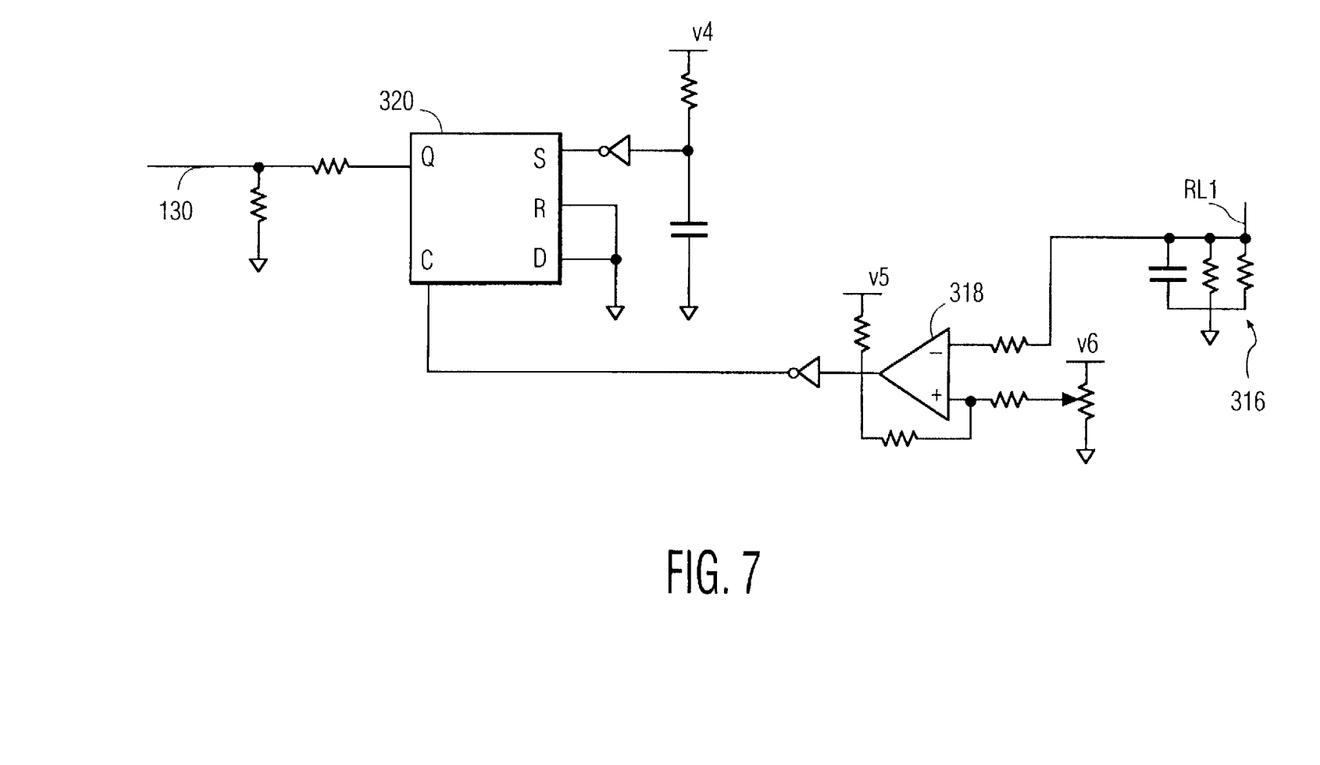
FIG. 7 is a schematic diagram illustrating the frequency sweep function associated with start-up.

As illustrated in FIGS. 6–7, start-up circuit 320 provides the function of initial frequency sweeping for lamp ignition. Start-up circuit 320 includes voltage controlled oscillator (VCO) 312, single pulse flip-flop 314 in FIG. 6 and a DC voltage sensing and scaling circuit 316 (FIG. 7). VCO 312 is preferably voltage-to-frequency converter AD654 produced by Analog Devices of Norwood, Massachusetts, the specifications of which are incorporated by reference herein, although any suitable VCO is contemplated for use in this circuit. Comparator 318 and single pulse flip flop 320 in FIG. 7. The start-up process is described as follows. In FIG. 6, before the DC bus voltage V is fully built up, the voltage in line 130 is low and the output pin Q of the flip flop 314 is high. VCO 312 starts to operate at high frequency region $f_{start}$ which leads to a high frequency square wave signal in line 123. The output voltage of the resonant circuit B is low due to the high frequency operation and lower DC bus voltage V.

When the DC bus voltage is increased to a preset threshold, the output voltage of comparator 318 in FIG. 7 is set to low. This in turn triggers the flip flop 320 and sets the voltage to high at line 130. Effectively, in FIG. 6, the voltage input at control voltage terminal (pin 4) of VCO 312 is reduced gradually. Correspondingly, the output frequency produced by VCO 312 is reduced. This process completes the frequency sweeping from high frequency $f_{start}$ to lower operating frequency $f_{op}$. Correspondingly, the resonant circuit output voltage to the lamps L1, L2, L3 and L4 is gradually increased until the lamps are ignited. After the lamps are operating, the processed current signal in line 122 triggers the flip-flop 314 and the output signal on line 123 is blocked by using the OR gate 322. Subsequently, the power supply in FIG. 3 operates at a self-oscillating frequency with predetermined phase angle $\phi_{ref}$.

Figure 8:
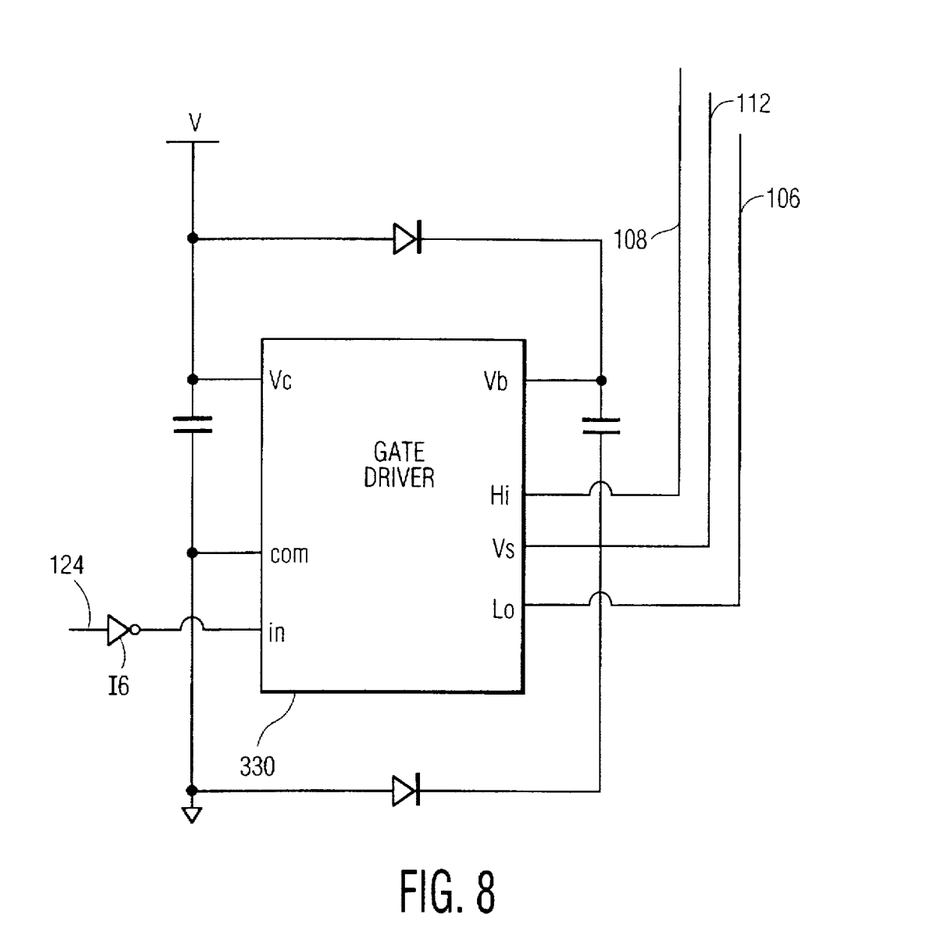
FIG. 8 is a schematic diagram illustrating the bridge driver circuitry.
Figure 8A:
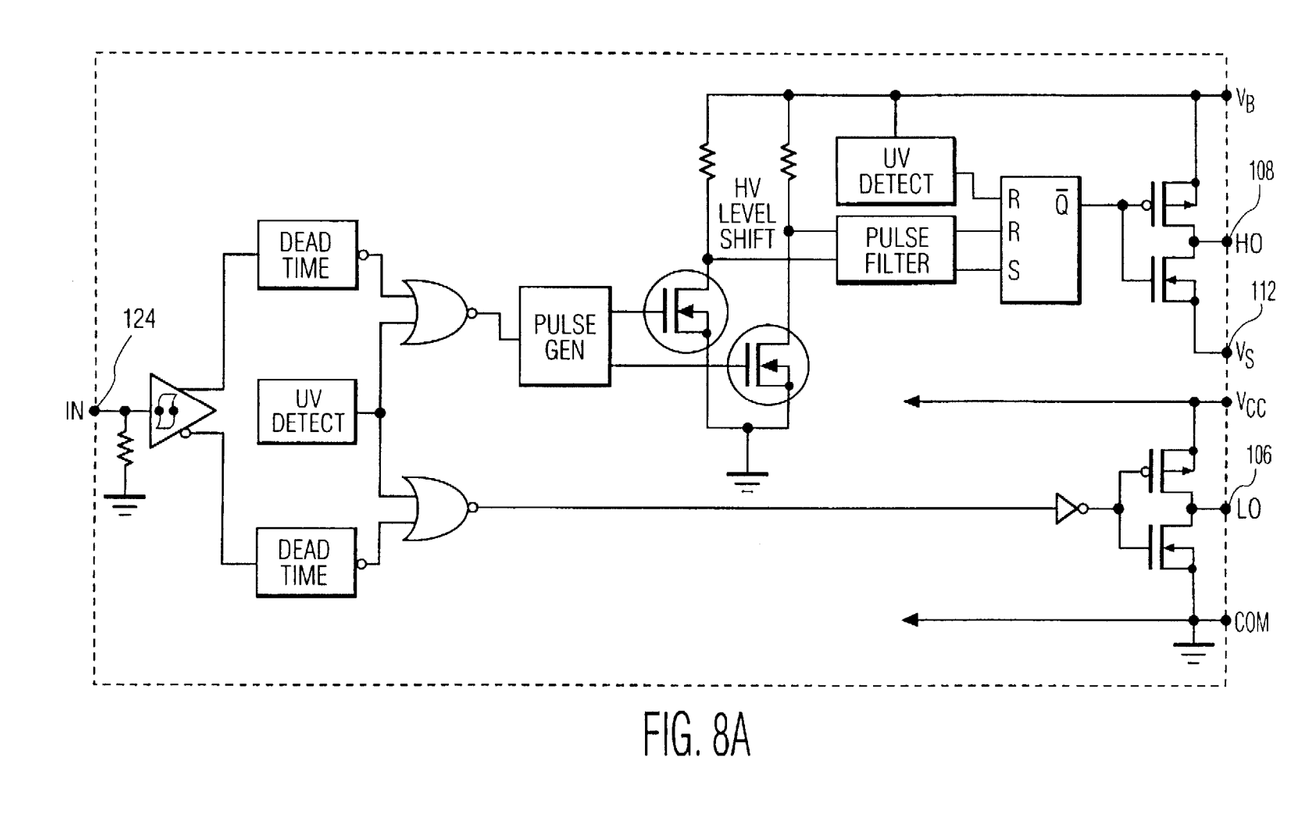
FIG. 8A is a schematic diagram illustrating the functions of the driver IC.

Turning now to FIG. 8, the signal 124 is inverted at logical inverter I6. The signal subsequently passes to the "in" terminal at gate driver 330, such as half-bridge driver integrated circuit IR2111 produced by International Rectifier, El Segundo, California, the specifications of which are incorporated by reference herein and illustrated at FIG. 8A. With continued reference to FIG. 8, gate driver 330 includes logic to convert a single square wave input signal, such as that on line 124, into two separate driving signals on lines 108 and 106 which control switches Q1 and Q2, respectively. Gate driver 330 may be configured to produce signals 108 and 106 such that a blanking time exists in which neither Q1 nor Q2 conduct.

Figure 9:
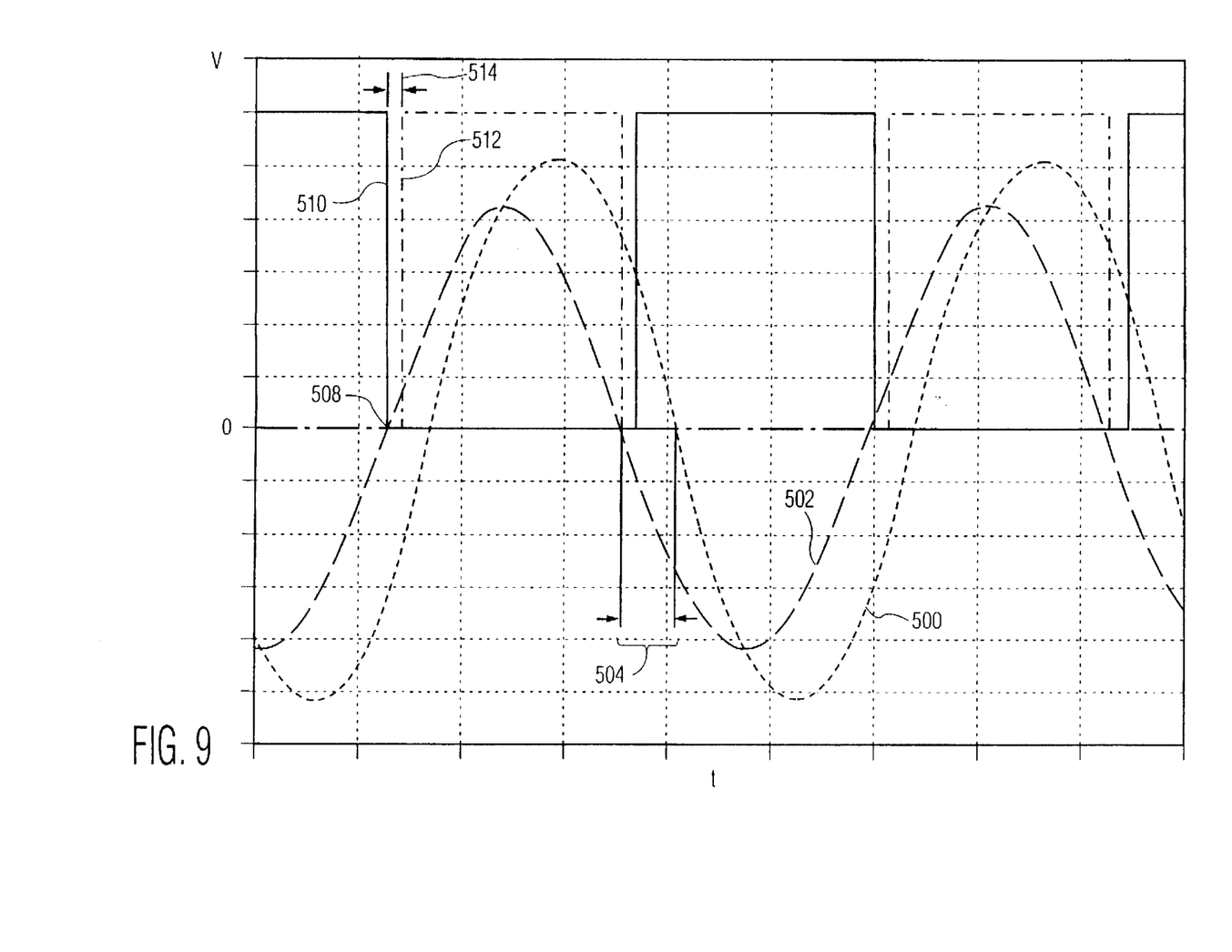
FIG. 9 is a time plot of the current flowing through the resonant circuit, the phase-shifted signal, and the switching sequence of the switches.

The waveforms produced by the above-described circuit are represented in the time plot illustrated in FIG. 9. The current flowing through the resonant circuit B is represented on the plot by signal 500. Within driving circuit C, this signal corresponds to the voltage signal on line 114, which is proportional to the current and has been filtered of lower frequency components by high-pass filter 204 (See, FIGS. 3–4). As described above, the signal on line 114 passes through automatic gain control 206 and phase-shifting circuitry 208. The phase shifted signal 502 corresponds to the output of phase-shifting circuitry 208 on line 118 (See, FIG. 4). The phase-shifted signal 502 is phase-shifted by an amount 504 corresponding to $\phi_{ref}$ as described above. The zero-crossing point of signal 502 is used as the reference to control switching. Thus, at the zero-crossing point 508, switch Q1 is turned off, as indicated by line 510 (solid line) and switch Q2 is turned on, as indicated by line 512 (dot-dash line). The figure illustrates that Q2 is turned on at the same time that Q1 is turned off. A blanking time 514 is ordinarily provided by driver 304 such that Q1 and Q2 are both off for a brief period of time.

While there has been shown to be what are presently considered to be the preferred embodiments of the invention, it will apparent to those of ordinary skill in the art that various modifications can be made without departing from the scope of the invention as defined by the appended claims. Accordingly, the disclosure is illustrative only and not limiting.

What is claimed is:

1. A power supply, which comprises:
   a) a resonant circuit;
   b) a voltage-fed inverter producing a voltage at an output coupled to the resonant circuit, the inverter responsive to a driving signal; and
   c) a driving circuit having an input representing a sensed current flowing through the resonant circuit and including phase-shifting circuitry, the driving circuit producing the driving signal based on a phase-shift of the sensed current by the phase-shifting circuitry.

2. A power supply as recited in claim 1, wherein the phase-shifting circuitry applies a predetermined positive phase angle shift to the sensed current input such that the voltage at the output of the inverter is leading the sensed current input with the predetermined positive phase angle.

3. A power supply as recited in claim 2, wherein the driving signal actuates a switch in the inverter when the phase-shifted sensed current signal crosses zero.

4. A power supply as recited in claim 3, wherein the phase shifting circuitry includes an all-pass filter.

5. A power supply as recited in claim 1, wherein the driving circuit includes a filter for suppressing a low frequency component of the sensed current flowing through the resonant circuit.

6. A power supply as recited in claim 1, which further comprises a load, wherein the load is a low-pressure discharge lamp.

7. A power supply as recited in claim 1, which further comprises a load, wherein the load is a multiple low-pressure discharge lamp configuration.

8. A power supply, which comprises:
   a) a resonant circuit;
   b) a voltage-fed half-bridge inverter producing a voltage at an output coupled to the resonant circuit, the inverter responsive to a driving signal; and
   c) a driving circuit having an input representing a sensed current oscillating through the resonant circuit and including phase-shifting circuitry, the driving circuit producing the driving signal based on a phase-shift of the sensed current by the phase-shifting circuitry.

9. A power supply as recited in claim 8, wherein the phase-shifting circuitry applies a predetermined positive phase angle shift to the sensed current input such that the voltage at the output of the inverter is leading the sensed current input with the predetermined positive phase angle.

10. A power supply as recited in claim 9, wherein the driving signal actuates a switch in the inverter when the phase-shifted sensed current signal crosses zero.

11. A power supply as recited in claim 10, wherein the phase shifting circuitry includes an all-pass filter.

12. A power supply as recited in claim 8, wherein the driving circuit includes a filter for suppressing a low frequency component of the sensed current flowing through the resonant circuit.

13. A power supply as recited in claim 8, which further comprises a load, wherein the load is a low-pressure discharge lamp.

14. A method for switching a power supply, which comprises:
   providing a resonant circuit having a current oscillating therethrough;
   providing an inverter responsive to a driving signal and producing a voltage at an output coupled to the resonant circuit;
   applying a phase-angle shift to the current oscillating through the resonant circuit and producing a phase-shifted current signal;
   driving the inverter based upon the phase-shifted current signal.

15. A method for switching a power supply as recited in claim 14, which further comprises the step of:

filtering the current signal to suppress low frequency components prior to applying the phase shift.

16. A method for switching a power supply as recited in claim 14, wherein the step of driving the inverter includes actuating a switch in the inverter when the phase-shifted current signal crosses zero.

17. A method for switching a power supply, which comprises:

providing a resonant circuit having a current oscillating therethrough;

providing an inverter responsive to a driving signal and producing a voltage at an output coupled to the resonant circuit;

sensing the current oscillating through the resonant circuit and producing a sensed current signal proportional to the current;

applying a phase-angle shift to the sensed current signal and producing a phase-shifted signal; and applying a driving signal to the inverter based upon zero-crossing points of the phase-shifted signal.

18. A method for switching a power supply as recited in claim 17, wherein the step of applying a driving signal to the inverter includes actuating a switch in the inverter when the phase-shifted current crosses zero.

19. A method for switching a power supply as recited in claim 17, which further comprises the step of:

filtering the sensed current signal to suppress low frequency components prior to applying the phase shift.

* * * * *